United States Patent
Zhou et al.

(10) Patent No.: US 8,442,063 B1
(45) Date of Patent: May 14, 2013

(54) SYSTEM AND METHOD FOR SCHEDULING UNICAST AND MULTICAST TRAFFIC

(76) Inventors: Xuyang Zhou, Shanghai (CN); Yongbing Xu, Shanghai (CN); Xiaoxi Sun, Shanghai (CN)

( * ) Notice: Subject to any disclaimer, the term of this patent is extended or adjusted under 35 U.S.C. 154(b) by 406 days.

(21) Appl. No.: 12/642,998

(22) Filed: Dec. 21, 2009

(51) Int. Cl.
  *H04L 12/58* (2006.01)
  *H04L 12/54* (2006.01)

(52) U.S. Cl.
  USPC .......................... 370/413; 370/429

(58) Field of Classification Search .............. 370/390, 370/412, 413, 429
  See application file for complete search history.

(56) References Cited

U.S. PATENT DOCUMENTS

| | | | | |
|---|---|---|---|---|
| 6,941,392 B2 * | 9/2005 | Shemla et al. | | 710/35 |
| 7,586,911 B2 * | 9/2009 | Lien et al. | | 370/389 |
| 7,627,870 B1 * | 12/2009 | Michaeli et al. | | 719/313 |
| 2004/0114616 A1 * | 6/2004 | Wang | | 370/412 |
| 2006/0268868 A1 * | 11/2006 | Han et al. | | 370/390 |
| 2006/0292292 A1 * | 12/2006 | Brightman et al. | | 427/66 |
| 2007/0248082 A1 * | 10/2007 | Nielsen | | 370/360 |
| 2008/0117913 A1 * | 5/2008 | Tatar et al. | | 370/392 |
| 2009/0175286 A1 * | 7/2009 | Naven et al. | | 370/412 |

\* cited by examiner

*Primary Examiner* — Dang Ton
*Assistant Examiner* — Ryan Kavleski
(74) *Attorney, Agent, or Firm* — Bay Area Technology Law Group

(57) ABSTRACT

A system and method for scheduling delivery of packetized data traffic at an output port of a network node featuring a hybrid queue with a unicast subqueue and a multicast subqueue. An interleave indicator for each unicast and multicast entry in the queue is used to toggle the header type field of the hybrid queue. Upon departure, a scheduler selects between the unicast subqueue and multicast subqueue as dictated by the state of the header type field. The disclosed interleave indicator techniques add minimal overhead to the system, allowing ready scaling with increasing port densities. Further, the data structure of the multicast subqueue can be selected to optimize the system and achieve desired performance characteristics.

19 Claims, 3 Drawing Sheets

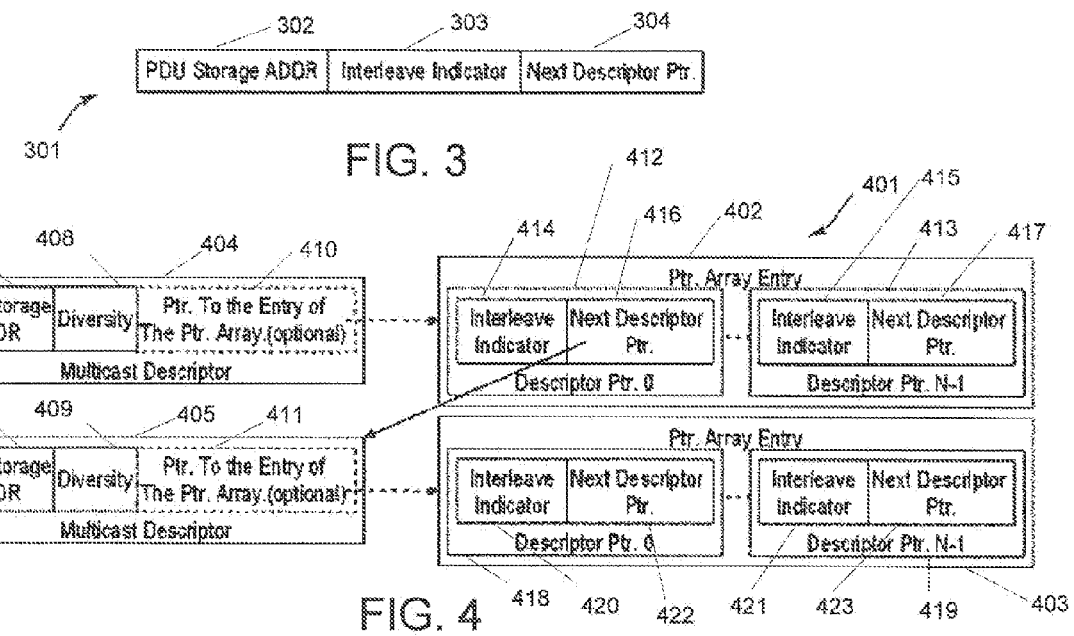
FIG. 3
FIG. 4
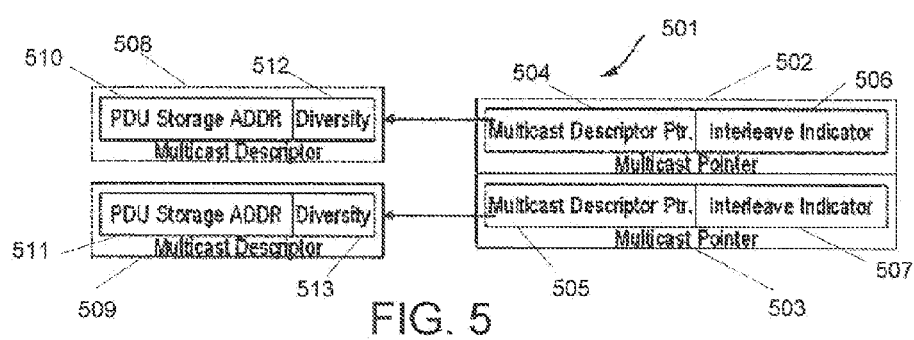
FIG. 5
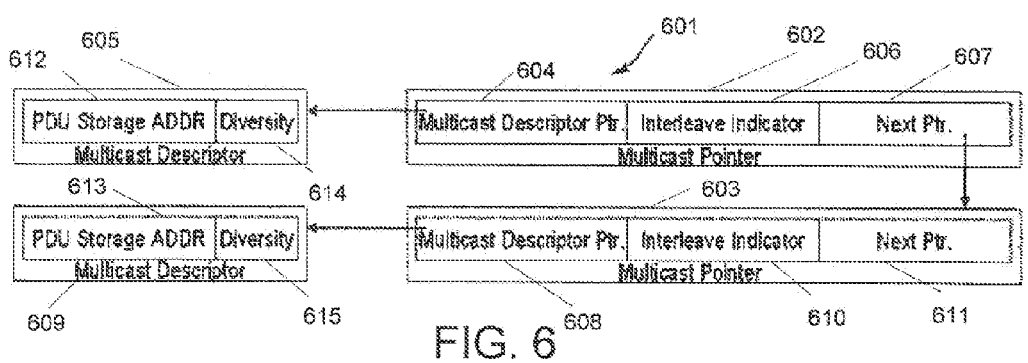
FIG. 6

SYSTEM AND METHOD FOR SCHEDULING UNICAST AND MULTICAST TRAFFIC

FIELD OF THE PRESENT INVENTION

The present invention relates to data communication systems in general, and more specifically, to scheduling multicast and unicast packet switching to improve data transport.

BACKGROUND OF THE INVENTION

Data communication systems employing packet switching strategies can offer desirable advances in resource utilization and reliability with minimal losses in delivery speed. Digital data is divided into packets, each of which is routed independently to its destination. Access to, routing within and delivery from the network for the packets is mediated by a framework of routers, adapters, switches and other network nodes, generally termed the switching fabric. This configuration allows the network to dynamically adjust to the demands of varying traffic patterns. As will be appreciated, an important consideration in the design of such networks is the efficient use of inputs and outputs, so that an adequate number are available to provide the desired level of throughput without incurring the expense of providing an excess that go underutilized for significant periods of time. A primary technique for allocating network resource to achieve this minimization of contention and avoidance of starvation is the use of buffers and queues to asynchronously transmit the data streams of packets.

A typical approach to facilitate the routing and switching of the individual data packets is to employ the use of descriptors that identify the destination of each packet and its storage location within the memory of the network. Since the descriptors can be significantly smaller than the packets themselves, manipulating the descriptors provides important savings in processing time and storage requirements.

Despite the advantages, packet switching systems cannot rely on a dedicated connection between two points on the network, such as that offered by circuit switching systems. Thus, each packet in a given data stream potentially experiences different latencies and transmission rates, resulting in the possibility that packets will arrive at the destination at of order or that some packets may be dropped. These concerns are less important when dealing with static files, but for the streaming delivery of multimedia content or real time communication applications, for example, robust and timely delivery of the packets is a priority. To maintain adequate quality of service (QoS) for such applications, techniques have been developed to assign varying priority levels to the packets of data. Accordingly, the buffering and queuing process carried out within the switching fabric must be able to implement these priorities in the delivery of data. In systems employing descriptors, the priority information is included along with the location and destination information recorded by the descriptor.

Another challenge in the implementation of packet switched networks is the distinction between unicast data and multicast data. As indicated by the name, unicast data deals with information being delivered from a single sender to a single recipient. Thus, unicast packets consume one input port and one output port of the switching fabric. On the other hand, multicast data can originate from one or more senders and be delivered to one or more recipients. Generally, the multicast packets are replicated during the delivery process by the network and are fanned-out to the desired output ports. Generally, in modern networks, each node comprises N bidirectional ports, each allowing for inbound or outbound traffic. In the worst case scenario, a single multicast packet may consume only a single input port but consume all available outgoing ports (N−1), leading to starvation of traffic. Again, the buffering and queuing strategies employed by the network system should accommodate these situations to allow for "fair" scheduling of unicast and multicast traffic to prevent starvation of one type.

One prior art technique is disclosed in U.S. Pat. No. 7,397, 809 to Wang. The implementation disclosed in this reference makes use of hybrid queue composed of a linked list of descriptors for unicast data and a first in, first out (FIFO) buffer of pointers for multicast descriptors. To schedule between multicast and unicast traffic, the system employs an arrival counter, a departure counter and each multicast FIFO entry has an inter-departure-counter value specifying the number of unicast linked list entries that have to be serviced before servicing the multicast FIFO entry.

Despite the advantages offered by this approach, it does suffer from certain drawbacks. Specifically, the scheduling between the unicast and multicasts depends upon the counters, the inter-departure-counter for each multicast FIFO entry and the arrival and departure counters for each queue. This requirement prevents the system from scaling well with variable length queues. Furthermore, the Wang reference requires the use of a fixed multicast FIFO entry for every queue. As one of skill in the art will recognize, this does not represent the most efficient use of memory space, since each FIFO buffer requires a fixed amount of space. Similarly, this makes the system less scalable for worst case tolerance.

Therefore, it would be desirable to provide systems and methods that allow for efficient and scalable scheduling of multicast and unicast packetized data traffic. It would also be desirable to provide systems and methods for providing such scheduling while minimizing the overhead imparted to output queues. Finally, it would be desirable to provide such systems and methods that enable the use of multiple data structures for multicast queues.

SUMMARY OF THE INVENTION

In accordance with the above needs and those that will be mentioned and will become apparent below, this disclosure is directed to a hybrid queue for an output port of a protocol data unit (PDU) switching node comprising a plurality of entries, a header type field, a tail type field, a unicast subqueue, and a multicast subqueue, wherein the unicast subqueue includes at least one the entries, wherein the multicast subqueue includes at least one of the entries, and wherein the header type field is configured to signal a processing order for the unicast subqueue and the multicast subqueue. Preferably, each entry comprises an interleave indicator and the header type field is toggled between a first value and a second value depending upon the value of at least one of the interleave indicators.

In one aspect, the header type field is toggled when an entry having an interleave indicator with a first value is processed. Preferably, the default value for the interleave indicators of unicast entries is the first value. Also preferably, the default value for interleave indicators of multicast entries is a second value that does not toggle the header type field when processed.

In another aspect, the tail type field is set to a first value when a unicast entry is appended to the hybrid queue and is set to a second value when a multicast entry is appended to the hybrid queue. Preferably, at least one interleave indicator is set to a value corresponding to the tail type field before a unicast entry is appended to the hybrid queue.

In one embodiment, the unicast subqueue is configured as a linked list of unicast descriptors. In a further embodiment, the multicast subqueue is configured in a data structure selected from the group consisting of a multicast pointer array, a FIFO multicast pointer queue, and a linked list of multicast pointers.

The disclosure is also directed to an output port of a protocol data unit (PDU) switching node comprising the hybrid queue as described above and a scheduler. Preferably, the scheduler is configured to process a head of line entry from the unicast subqueue when the header type field is set to the first value and a head of line entry from the multicast subqueue when the header type field is set to the second value.

In yet another aspect of the disclosure, each interleave indicator is a single bit.

The disclosure is further directed to a method for scheduling multicast and unicast traffic at an output port of a protocol data unit (PDU) switching node comprising the steps of: generating a hybrid queue for the output port including a plurality of entries corresponding to stored PDUs, a header type field, a tail type field, a unicast subqueue, and a multicast subqueue, wherein the unicast subqueue includes at least one the entries, wherein the multicast subqueue includes at least one of the entries, and wherein each entry has an interleave indicator and toggling the header type field between a first value and a second value depending upon the value of at least one of the interleave indicators.

Preferably, such methods also include the step of servicing a hybrid queue entry wherein the interleave indicator of the hybrid queue entry has a first value, so that the header type field is toggled because the interleave indicator has the first value.

Further, the step of generating a hybrid queue can include appending a unicast entry to the unicast subqueue, wherein the appended unicast entry has an interleave indicator with the first value, and appending a multicast entry to the multicast subqueue, wherein the appended multicast entry has an interleave indicator with a second value. Preferably, the method further includes the step of servicing a hybrid queue entry wherein the interleave indicator of the hybrid queue entry has the second value, so that the header type field is not toggled because the interleave indicator has the second value.

In another aspect, the method also includes setting the tail type field to a first value when a unicast entry is appended to the hybrid queue and setting the tail type field to a second value when a multicast entry is appended to the hybrid queue. Preferably, this can include appending a first entry to the hybrid queue having an interleave indicator, determining a next hybrid queue entry is a unicast entry, changing the value of the first interleave indicator to a value dictated by the tail type field and appending the next hybrid queue entry.

In yet another aspect, the method includes servicing a hybrid queue entry by scheduling a head of line entry from the unicast subqueue when the header type field is set to first value and scheduling a head of line entry from the multicast subqueue when the header type field is set to the second value.

BRIEF DESCRIPTION OF THE DRAWINGS

Further features and advantages will become apparent from the following and more particular description of the preferred embodiments of the invention, as illustrated in the accompanying drawing, and in which like referenced characters generally refer to the same parts or elements throughout the views, and in which:

FIG. 3 is a schematic depiction of the configuration of a suitable unicast descriptor;

FIG. 4 is a schematic depiction of one embodiment of a suitable multicast subqueue having a pointer array;

FIG. 5 is a schematic depiction of another embodiment of a suitable multicast subqueue having a FIFO queue; and FIG. 6 is a schematic depiction of yet another embodiment of a suitable multicast subqueue having a linked list of multicast pointers.

DETAILED DESCRIPTION OF THE INVENTION

Figure 1:
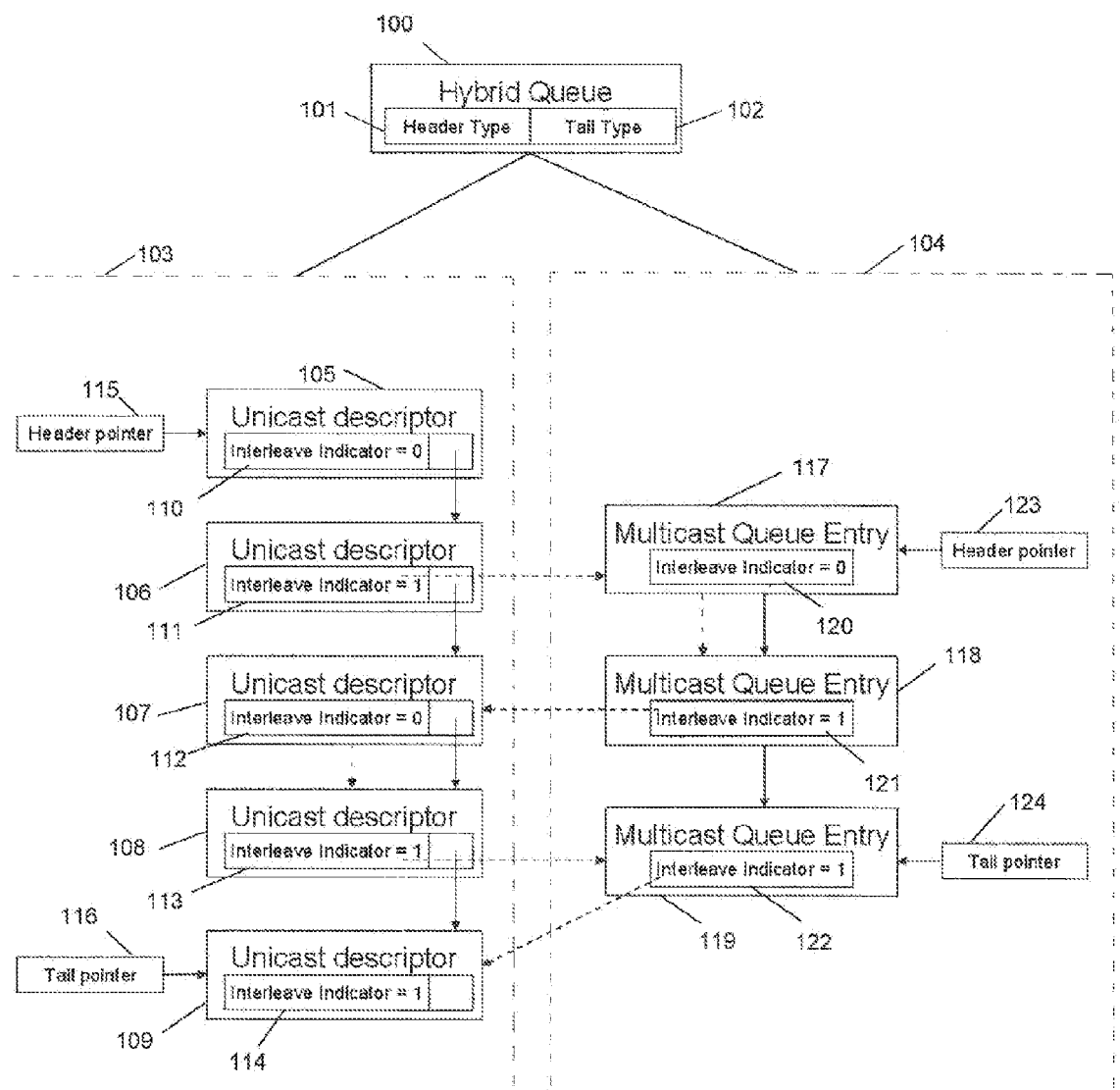
FIG. 1 is a schematic illustration of elements of a hybrid queue, according to the invention.

As discussed above, the systems and methods of this disclosure feature a hybrid queue having a unicast subqueue and a multicast subqueue. An interleave indicator for each unicast and multicast entry in the queue is used to toggle the header type field of the hybrid queue. Upon departure, a scheduler selects between the unicast subqueue and multicast subqueue as dictated by the state of the header type field. The disclosed interleave indicator techniques add minimal overhead to the system, allowing ready scaling with increasing port densities. Further, the data structure of the multicast subqueue can be selected to optimize the system and achieve desired performance characteristics.

By implementing the hybrid queue techniques as described herein, the storage requirements of the system can be minimized by avoiding replication of multicast descriptors. Further, the bandwidth requirements are reduced to allow for increased port densities. Similarly, the systems are more scalable to accommodate increased port densities or data buffers.

At the outset, it is to be understood that this disclosure is not limited to particularly exemplified materials, architectures, routines, methods or structures as such may, of course, vary. Thus, although a number of such option, similar or equivalent to those described herein, can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

As used herein, the term "PDU" refers to a protocol data unit which generally corresponds to a packet of information having an associated network destination address.

As used herein, the term "descriptor" refers to a data structure having information that identifies the location of a PDU within the memory storage of the switching node of the network. A descriptor can also include, without limitation, information identifying the PDU as unicast or multicast, fan-out diversity in the case of multicast traffic, service priority and network destination address.

As used herein, the term "queue entry" refers to a data structure having information that identifies the location of a PDU within the memory storage of the switching node of the network. For example, a unicast queue entry is a unicast descriptor and a multicast queue entry can be a multicast descriptor, a multicast pointer to a descriptor, or a multicast pointer array.

In accordance with this disclosure, the bask operation of packet switching follows conventional patterns. Each packet, or PDU, arrives through an input port of a network switching node. The arriving PDUs are inspected, descriptors for the PDUs are generated and the PDUs are stored in the memory of the node. Preferably, the descriptor for each PDU contains information including the priority associated with the PDU, the type of PDU (whether unicast or multicast), its size, its location in storage, delivery information and other pertinent details, depending upon the application.

From the delivery information, one or more destination network addresses are correlated with each PDU, depending upon whether it is unicast or multicast traffic. Using the network addresses, switch requests are queued so that the PDUs will be delivered to the appropriate output ports using switching or routing tables as known in the art. In implementations having tiered levels of priority to ensure a specific QoS, the relevant priority information from the descriptors is also used to generate the switch requests. Thus, as a result of the switch requests, multicast and unicast queue entries are stored in a hybrid output queue for each output port. To deliver the packet, a scheduler or sequencer selects an entry from the hybrid queue, which specifies a multicast or unicast PDU. The PDU is then retrieved from memory storage, switched to the indicated output port and delivered from the network node.

As one of skill in the art will recognize, the memory of the system for PDU storage, descriptor storage, buffering and queuing can be implemented in any number of suitable ways. For example, in some embodiments a centralized storage can utilize logical partitions to accommodate the various required elements. Alternatively, multiple physical memory locations may be used if desired. These aspects can be readily tailored by using types of memory having different read and write speeds and latencies, as well as by employing caching strategies and the like.

Turning now to FIG. 1, an example of an output hybrid queue 100 is schematically diagrammed. As shown, hybrid queue includes a header type field 101, a tail type field 102, a unicast subqueue 103 and a multicast subqueue 104. The header type field 101 is used to signal the order in which entries from the unicast subqueue 103 and the multicast subqueue 104 are processed.

Unicast subqueue 103 comprises a series of unicast descriptors 105-109 in a linked list configuration. The use of a linked list creates a virtual queue wherein the location of a subsequent entry is identified by a pointer included in the previous entry. One of skill in the art will recognize this allows for an efficient utilization of memory, since the linked list entries can be placed at arbitrary locations rather than requiring a fixed block of memory as required by a traditional FIFO queue.

Further, each descriptor includes an interleave indicator field 110-114. As described in greater detail below, the interleave indicator is used to control the header type field 101 of hybrid queue 100 and thus control the sequence of PDU departures. A header pointer 115 identifies the head of line (HOL) of the unicast subqueue while tail pointer 116 registers the end and signals the point at which subsequent unicast descriptors are to be appended.

Similarly, multicast subqueue 104 comprises a series of multicast entries 117-119, each of which also includes an interleave indicator field 120-122. Multicast subqueue 104 also includes a header pointer 123 and tail pointer 124.

As indicated, the interleave indicator in the unicast descriptors and multicast queue entries controls the order of departure from the unicast subqueue to multicast subqueue. The header type field 101 controls the order of departure from the hybrid queue 100. For example, a value of 0 in the header type field 101 specifies the HOL for unicast subqueue 103 and a value of 1 specifies the HOL for multicast subqueue 104. The tail type field 102 is used to identify the type of traffic associated with the last addition to hybrid queue 100, here a value of 0 indicates a unicast entry was appended and a value of 1 indicates a multicast entry was appended. In turn, the interleave indicator is used to toggle header type field 101 according to the sequence in which unicasts and multicasts are received. Preferably, the interleave indicator requires only one bit of information in the descriptor or entry.

In the embodiment shown, an interleave indicator value of 1 toggles header type field 101 while an interleave indicator value of 0 leaves header type field 101 unchanged. Thus, when a unicast descriptor or multicast queue entry having an interleave indicator with a value of 1 is serviced, header type field 101 is toggled so that the next departure will be the HOL of the other subqueue. Conversely, when a unicast descriptor or multicast queue entry having an interleave indicator with a value of 0 is serviced, header type field 101 is left unchanged so that the next departure will be the HOL of the same subqueue. As discussed below, each the interleave indicator is assigned a default value that initially depends upon the type of traffic, but can be changed depending upon the nature of the next entry to the hybrid queue.

In this implementation, the default value of the interleave indicator for a unicast descriptor is 1 while the default value for a multicast entry is 0. The arrival of a unicast entry triggers a potential changes to the default value of the preceding interleave indicator. Specifically, before appending a new unicast descriptor entry, the preceding interleave indicator is assigned the current value of tail type field 102. An example of this sequencing routine with respect to the hybrid queue 100 shown in FIG. 1. Upon arrival, a unicast descriptor 105 is appended to unicast descriptor subqueue 103 at a location designated by the tail pointer. Since this is the first unicast descriptor in the queue, header pointer 115 links to this descriptor. Interleave indicator 110 initially has the default value of 1. Header type field 101 is assigned a value of 0, so that the HOL of unicast subqueue 103 will be the selected for the next PDU to depart. Tail type field 102 is assigned a value of 0 to indicate that the current end of the hybrid queue 100 is the unicast subqueue 103. Tail pointer 116 is updated to reflect that unicast descriptor 105 is the current end of unicast subqueue 103.

The next entry to hybrid queue 100 is unicast descriptor 106. Before appending, the interleave indicator 110 of the preceding entry, unicast descriptor 105, is assigned the current value of tail type field 102, changing it to 0. Unicast descriptor 106 is then appended to the subqueue at the location indicated by tail pointer 116. Changes to the header type field 101 are implemented upon the departure of a PDU, so this field remains the same and no changes are made to tail type field 102 since this PDU is also a unicast. The interleave indicator 111 of unicast descriptor 106 is assigned the initial default value of 1. This will maintain the sequence of departure when these PDUs leave the queue. Tail pointer 116 is updated to reflect that unicast descriptor 106 is now the current end of unicast subqueue 103.

Additions to multicast subqueue 104 are made in an analogous manner, except arriving multicast entries do not trigger potential changes in the preceding interleave indicator. In the example shown, multicast queue entry 117 is entered into hybrid queue 100 after unicast descriptor 106. Header pointer 123 and tail pointer 124 maintain the order within multicast subqueue 104. Again, the header type field 101 is changed upon queue departures, so it remains unchanged. Tail type field 102 is now assigned a value of 1 to indicate that the end of multicast subqueue 104 now represents the end of hybrid queue 100. As discussed above, interleave indicator 120 of multicast queue entry 117 initially has a value of 0, the default value for a multicast entry.

As will be recognized, a single linked list implementation for both the multicast and unicast queues exemplified by the prior art creates a situation in which an incoming multicast requires updating every linked list descriptor of output port queues. As a result, the effective bandwidth consumption is N−1. In contrast, under the disclosed system, no changes are made to unicast descriptor 106 when multicast entry 117 is appended to hybrid queue 100. Here, the preceding interleave indicator 111 of unicast descriptor 106 retains its default value of 1. By implementing this alternation of unicast 103 and multicast 104 subqueues, the need to update each unicast descriptor is avoided. Accordingly, this represents a significantly improved worst-case tolerance situation than offered by a single linked list implementation that combines multicast and unicast entries. Since the bandwidth requirements are thus tied to the multicast entries, suitable systems can be designed that minimize bandwidth requirements by tailoring to the expected multicast traffic.

Next, a subsequent multicast queue entry 118 is appended to the end of multicast queue 104. Accordingly, no changes are made to header type 101, tail type 102 fields or to the interleave indicator of the preceding entry. Here, the preceding entry is multicast entry 117 and thus interleave indicator 120 remains at its default value of 0. The current interleave indicator 121 initially has a value of 0, since that is the default for the multicast data type.

As described above, when a subsequent addition to hybrid queue 100 is a unicast descriptor, descriptor 107 as shown here, the preceding interleave indicator is assigned to the current tail type 102 value. Here, interleave indicator 121 of multicast queue entry 118 is changed from its default of 0 to 1. The interleave indicator 112 of unicast descriptor 107 initially is assigned the default value of 0 for a unicast data type. Tail type field 102 is changed to 0 to represent that the current entry is a unicast type.

Further entries are appended to hybrid queue 100 in the same way. In the example shown, before adding unicast descriptor 108, the preceding interleave indicator 112 is assigned the current value of tail type field 102, which as indicated above is 0. Unicast descriptor 108 includes interleave indicator 113 with its initial default value of 1. The tail type 102 is updated to 0 since the entry being appended is a unicast. The next entry is multicast queue entry 119, so no changes are made to the preceding entry's interleave indicator. The tail type field 102 is set to 1 and multicast queue entry 119 has interleave indicator 122 with an initial default value of 0. Finally, before unicast descriptor 109 is appended to hybrid queue 100, the preceding interleave indicator 122 is set to 1, the current value of tail type field 102. Unicast descriptor 109 is then appended to unicast subqueue 103 with a default interleave indicator of 1 and tail type field 102 is changed to 0 to indicate that the most recent addition is a unicast.

Figure 2:
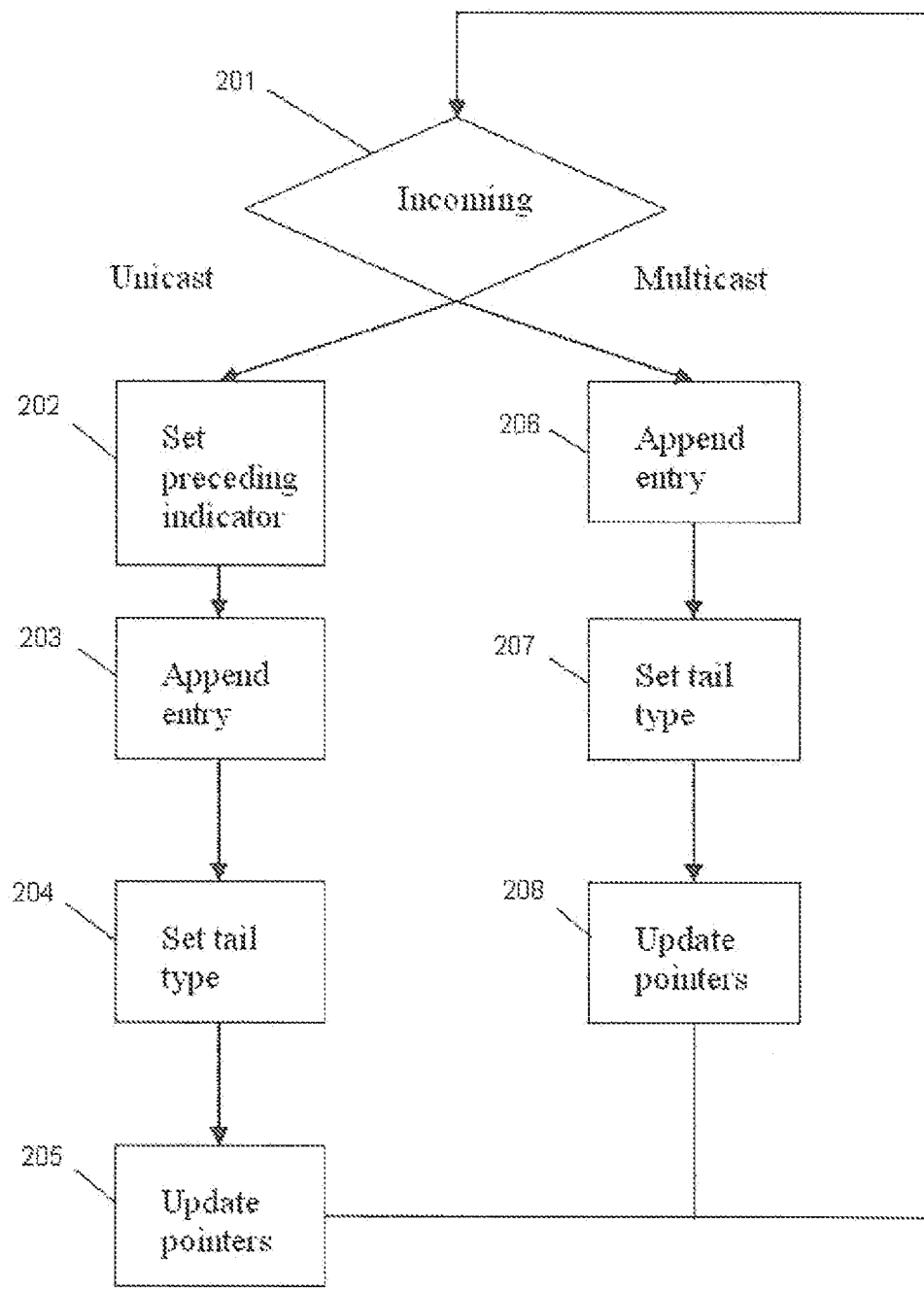
FIG. 2 is a flow chart depicting steps in the process of adding unicast and multicast entries to a hybrid queue, according to the invention.

Turning now to FIG. 2, a flow chart of the primary steps in the above described routine is depicted. In step 201, incoming entries are analyzed to distinguish between unicast entries and multicast entries. If either the header type field 101 or tail type field 102 has a null value, then it is set to 0 if the entry is a unicast and 1 if the entry is a multicast. If the entry is a unicast, the process goes to step 202. The interleave indicator for the preceding entry is set to the current value of tail type field 102. Next, in step 203, the current entry is placed in the linked list at the address indicated by tail pointer 116 with an interleave indicator having a value of 1. In step 204, the tail type field 102 is set to 0 to correspond to the unicast entry. Finally, in step 205, the tail pointer 116 is updated and the process returns to step 201.

Similarly, if the current entry is a multicast queue entry, the process goes from step 201 to step 206, where the multicast entry is appended at the location indicated by tail pointer 124 with an interleave indicator having a value of 0. Next, in step 207, the tail type field value is set to 1 to indicate the current last entry is a multicast entry. Finally, in step 208, the tail pointer 124 is updated and the process returns to step 201.

In view of the interrelation between the header type 101 and tail type 102 fields and the respective interleave indicators 110-114 and 120-122, the sequence of dequeuing is determined. The scheduler inspects the header type 101 of hybrid queue 100. If the field has a value of 0, the HOL of the unicast subqueue 103 is selected for departure. If the HOL unicast descriptor has an interleave indicator with a value of 1, the header type 101 is toggled to a value of 1, otherwise the header type is unchanged. Conversely, if the header type field 101 has a value of 1, the HOL of the multicast subqueue 104 is selected for departure. If the HOL multicast queue entry has an interleave indicator with a value of 1, the header type 101 is toggled to a value of 0, otherwise the header type is unchanged. The process is then repeated, with the scheduler selecting between the unicast subqueue and the multicast subqueue on the basis of the current value in header type field 101.

An example of these steps is shown in FIG. 1, where the dequeue order is depicted by broken arrows. Since the initial entry to hybrid queue 100 was unicast descriptor 105, header type 101 initially was assigned a value of 0 to indicate that the HOL is the unicast subqueue 103. Thus, a departure scheduler selects unicast subqueue 103 and is directed to the current HOL, unicast descriptor 105 by header pointer 115. Upon processing, interleave indicator 110 has a value 0, so header type 101 is not changed. Header pointer 115 is updated to indicate the new HOL of the unicast subqueue 103, now unicast descriptor 106.

Since header type 101 remains at 0, the next departure also is selected from the unicast subqueue 103. Unicast descriptor 106 has an interleave indicator 111 with a value of 1. Correspondingly, when this descriptor is processed, header type 101 is toggled, which in this situation changes it from 0 to 1. Now, the next departure will be selected from the multicast subqueue 104. Header pointer 123 indicates that multicast queue entry 117 is the current HOL of this subqueue. Accordingly, scheduler processes entry 117, which includes interleave indicator 120 with value 0. Thus, header type 101 remains unchanged at its current value of 1. Upon departure of multicast entry 117, header pointer 123 is updated to indicate multicast entry 118 is the new HOL. The header type value of 1 means that the scheduler selects the multicast subqueue 104 and thus multicast entry 118 for the next departure. Since entry 118 has an interleave indicator 121 value of 1, the header type 101 is toggled, changing from 1 to 0.

In this manner, the remaining sequence of departures is unicast descriptor 107 with interleave indicator 112 having a value of 0, then unicast descriptor 108 with interleave indicator 113 having a value of 11, then multicast queue entry 119 with interleave indicator 119 having a value of 1 and finally unicast descriptor 109. As will be appreciated, each time an entry having an interleave indicator of 1 is processed, the scheduler will alternate between the unicast and multicast subqueues.

Preferably, the unicast subqueue 103 is configured as a linked list. As such, a suitable format for the unicast descriptors is shown in FIG. 3. Generally, the unicast descriptor 301 includes an address 302 indicating the location of each PDU in the memory structure of the network node, an interleave indicator 303 as described above, and a pointer 304 that chains to the next unicast descriptor. As will be appreciated, the pointer 304 of a unicast descriptor is updated when the subsequent unicast descriptor is appended to the unicast subqueue 103.

The multicast subqueue 104 portion of hybrid queue 100 can be configured in a variety of ways depending on the intended applications of the system to optimize various aspects of its performance. As will be recognized, it is desirable to utilize a multicast subqueue comprising pointers to the multicast descriptors rather than the descriptors themselves. By avoiding the need to replicate multicast descriptors, considerable efficiencies are realized, particularly for situations where the diversity of the multicast is relatively high. For example, the multicast subqueue 104 can be implemented as a pointer array or a multicast pointer queue using a fixed FIFO queue, a linked list or a hybrid of the two. Alternatively, the multicast subqueue can be configured as a linked list queue of multicast descriptors.

In one embodiment, representative entries of a two-dimensional pointer array 401 are shown in FIG. 4. Generally, multicast subqueue 103 entries include pointer array rows 402 and 403 corresponding to multicast descriptors 404 and 405, respectively. Each multicast descriptor 404 and 405 includes an address 406 and 407 indicating the location of the PDU in memory storage. Each multicast descriptor 404 and 405 also includes a diversity field 408 and 409 which specify the fan-out of the multicast PDU. Finally, each multicast descriptor also can include a pointer to the row of the pointer array. Accordingly, pointer 410 of multicast descriptor 404 specifies the location of array row 402 and pointer 411 of multicast descriptor 405 specifies the location of array row 403. As will be recognized, if the size of the array equals the number of descriptors, each array entry is then mapped 1:1 to the descriptor. This implementation does not represent the most efficient use of resources as it allocates pointers at each port for every descriptor, all of which are unlikely to be consumed at a given time.

In turn, pointer array row 402 has a width equal to the number of possible output ports at the network node, that is 0 to N−1. The number of array rows corresponds to the number of multicast descriptors. Each array entry, for example 412 and 413, includes an interleave indicator 414 and 415 and next descriptor pointer 416 and 417. As shown, next descriptor pointer 416 links to the subsequent multicast descriptor 405.

Similarly, array entry pointer 411 of multicast descriptor 405 links to array row 403, also including N entries, including entries 418 and 419. Each entry respectively contains an associated interleave indicator 420 and 421 and next descriptor pointer 422 and 423.

By providing an array entry for each potential output port for every multicast descriptor, this embodiment is optimized for worst case tolerance. However, it does represent a tradeoff in efficiency since anything less than full fan-out diversity for each multicast results in empty array entries. This can result in a significant memory overhead and may cause slower processing times.

To optimize the efficiency of the system, other multicast subqueue structures can be used to conserve system resources. In one embodiment, shown in FIG. 5, a fixed FIFO queue 501 can be used for the multicast subqueue 103. Generally, FIFO queue 501 includes a sequence of multicast pointers, in this depiction two pointers 502 and 503 are shown. Each FIFO queue entry comprises a multicast descriptor pointer 504 and 505 and interleave indicator 506 and 507, respectively. As indicated, multicast pointer 504 links to the storage location of multicast descriptor 508. Likewise, multicast pointer 505 links to multicast descriptor 509. Each multicast descriptor 508 and 509 includes the memory address 510 and 511 of the multicast PDU and its associated fan-out diversity field 512 and 513, respectively.

To avoid the necessity of reserving memory space for FIFO queues and to further optimize the efficiency of the system, multicast subqueue can use a linked list 601 of multicast pointers entries as shown in FIG. 6. Here, two multicast pointer entries 602 and 603 are shown. Multicast pointer entry 602 includes multicast descriptor pointer 604 with the location of multicast descriptor 605, interleave indicator 606 and next pointer 607. Similarly, multicast pointer entry 603 includes multicast descriptor pointer 608 with the location of multicast descriptor 609, interleave indicator 610 and next pointer 611. As with the above multicast descriptors, multicast descriptors 605 and 609 respectively include the storage address 612 and 613 for their associated PDUs and a diversity field 614 and 615 to specify the multicast fan-out.

In yet another embodiment, the multicast subqueue can be configured to utilize a hybrid of FIFO queue and linked list multicast pointers. In such implementations, pointers are shared by allocating to blocks. Accordingly, the pointer in every block is a FIFO queue and the pointer block is a linked list.

The above description has been made with regard to various presently preferred embodiments. However, one of skill in the art will recognize that the teachings herein can be applied to a variety of different application as desired. As such, changes and modifications are properly, equitably, and intended to be, within the full range of equivalence of the following claims.

What is claimed is:

1. A protocol data unit (PDU) switching node comprising a hybrid queue having: a plurality of entries, a header type field, a tail type field, a unicast subqueue, and a multicast subqueue, wherein the unicast subqueue includes at least one of the entries, wherein the multicast subqueue includes at least one of the entries, wherein the header type field has a value selected from a group consisting of a first value and a second value to signal a processing order for the unicast subqueue and the multicast subqueue, wherein each entry comprises an interleave indicator having a value selected from the group consisting of the first value and the second value and wherein the header type field is toggled between the first value and the second value depending upon the value of the interleave indicator of a departing entry.

2. The PDU switching node of claim 1, wherein at least one interleave indicator has the first value and wherein the header type field is toggled when an entry having an interleave indicator with the first value is processed.

3. The PDU switching node of claim 2, wherein the interleave indicator of the at least one entry of the unicast subqueue has a default value comprising the first value.

4. The PDU switching node of claim 3, wherein the at least one entry of the multicast subqueue has an interleave indicator with the second value that does not toggle the header type field when the at least one entry of the multicast subqueue is processed.

5. The PDU switching node of claim 3, wherein the tail type field has a value selected from the group consisting of a first value and a second value and is set to the first value when a unicast entry is appended to the PDU switching node and is set to the second value when a multicast entry is appended to the hybrid queue.

6. The PDU switching node of claim 5, wherein at least one interleave indicator of an entry in the hybrid queue is set to the value of the tail type field before a unicast entry is appended to the hybrid queue.

7. The PDU switching node of claim 1, wherein the unicast subqueue is configured as a linked list of unicast descriptors.

8. The PDU switching node of claim 1, wherein the multicast subqueue is configured in a data structure selected from the group consisting of a multicast pointer array, a FIFO multicast pointer queue, and a linked list of multicast pointers.

9. The PDU switching node of claim 2 further comprising a scheduler.

10. The PDU switching node of claim 9, wherein the scheduler is configured to process a head of line entry from the unicast subqueue when the header type field is set to the first value and a head of line entry from the multicast subqueue when the header type field is set to the second value.

11. A method for scheduling multicast and unicast traffic at an output port of a protocol data unit (PDU) switching node comprising the steps of:
  generating a hybrid queue for the output port including a plurality of entries corresponding to stored PDUs, a header type field that has a value selected from a group consisting of a first value and a second value, a tail type field that has a value selected from the group consisting of the first value and the second value, a unicast subqueue, and a multicast subqueue, wherein the unicast subqueue includes at least one of the entries, wherein the multicast subqueue includes at least one of the entries, and wherein each entry has an interleave indicator having a value selected from the group consisting of the first value and the second value; and
  toggling the header type field between the first value and the second value, wherein the first and second values are configured to specify the unicast subqueue and the multicast subqueue, depending upon the value of the interleave indicator of a departing entry.

12. The method of claim 11, further comprising the step of servicing a hybrid queue entry wherein the interleave indicator of the hybrid queue entry has the first value, wherein the header type field is toggled because the interleave indicator has the first value.

13. The method of claim 12, wherein the step of generating a hybrid queue comprises appending a unicast entry to the unicast subqueue, wherein the appended unicast entry has an interleave indicator with the first value, and appending a multicast entry to the multicast subqueue, wherein the appended multicast entry has an interleave indicator with the second value.

14. The method of claim 13, further comprising the steps of servicing a hybrid queue entry wherein the interleave indicator of the hybrid queue entry has the second value and leaving the header type field unchanged because the interleave indicator has the second value.

15. The method of claim 13, further comprising the steps of setting the tail type field to the first value when a unicast entry is appended to the hybrid queue and setting the tail type field to the second value when a multicast entry is appended to the hybrid queue.

16. The method of claim 15, further comprising the steps of appending a first entry to the hybrid queue having a first interleave indicator, determining a next hybrid queue entry is a unicast entry, changing the value of the first interleave indicator of the first entry to the hybrid queue to the value of the tail type field and appending the next hybrid queue entry.

17. The method of claim 11, wherein the unicast subqueue is configured as a linked list of unicast descriptors.

18. The method of claim 17, wherein the multicast subqueue is configured in a data structure selected from the group consisting of a multicast pointer array, a FIFO multicast pointer queue, and a linked list of multicast pointers.

19. The method of claim 12, further comprising the step of servicing a hybrid queue entry by scheduling a head of line entry from the unicast subqueue when the header type field is set to the first value and scheduling a head of line entry from the multicast subqueue when the header type field is set to the second value.

* * * * *